United States Patent
Ishikawa (10) Patent No.: US 7,293,650 B2
(45) Date of Patent: Nov. 13, 2007

(54) TAPE CASSETTE STORAGE CASE HAVING A BUMPER PORTION

(75) Inventor: Ren Ishikawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 156 days.

(21) Appl. No.: 11/075,887

(22) Filed: Mar. 10, 2005

(65) Prior Publication Data

US 2005/0205447 A1  Sep. 22, 2005

(30) Foreign Application Priority Data

Mar. 10, 2004  (JP)  ............ P.2004-067449

(51) Int. Cl.
    B65D 85/575  (2006.01)
(52) U.S. Cl. .................. 206/387.13; 206/472
(58) Field of Classification Search ............ 206/387.1, 206/387.13, 387.14, 472–475
    See application file for complete search history.

(56) References Cited

U.S. PATENT DOCUMENTS 4,231,474 A * 11/1980 Takahashi ............. 206/387.13
4,724,957 A * 2/1988 Burgschweiger ....... 206/387.13
5,899,330 A * 5/1999 Sato et al. ............. 206/387.13
6,550,614 B1 * 4/2003 Onmori et al. ........ 206/387.13
6,622,863 B2 * 9/2003 Onmori et al. ........ 206/387.13
6,712,208 B2 * 3/2004 Onmori et al. ........ 206/387.13
6,752,269 B2 * 6/2004 Onmori et al. ........ 206/387.13
6,981,586 B2 * 1/2006 Onmori et al. ........ 206/387.13

FOREIGN PATENT DOCUMENTS

JP  2002-179176 A  6/2002

* cited by examiner

*Primary Examiner*—Bryon P. Gehman
(74) *Attorney, Agent, or Firm*—Sughrue Mion Pllc.

(57) ABSTRACT

A tape cassette storage case includes: a case body provided with a bottom plate having a rectangular shape and a side wall along a periphery of the bottom plate so that the tape cassette can be encased therein; a lid portion having a connecting portion connected to one side of the case body with a hinge so that the lid portion covers an opening side enclosed by the side wall; and a bumper portion provided at a periphery of the case body and the lid portion including an opposite side of the connecting portion so that the bumper portion projects to an outside from the side wall when the lid portion is a closed position, wherein the bumper portion has thick-walled portions at each corner of the bumper portion, the thick-walled portions being formed thicker than any other portions of the bumper portion.

7 Claims, 7 Drawing Sheets

TAPE CASSETTE STORAGE CASE HAVING A BUMPER PORTION

This application is based on Japanese Patent application JP 2004-067449, filed Mar. 10, 2004, the entire content of which is hereby incorporated by reference. This claim for priority benefit is being filed concurrently with the filing of this application.

BACKGROUND OF THE INVENTION

1. Technical Field of the Invention

The present invention relates to a tape cassette storage case, particularly to a technique for steadily protecting a tape cassette encased inside from impact of dropping or the like.

2. Description of the Related Art

In a related art hard case used for encasing a tape cassette, impact resistance for protecting the tape cassette encased therein, even when user has dropped the case by mistake, is required. In order to improve the impact resistance, it is necessary to use a tape cassette and a case that are capable of absorbing or sustaining the impact energy.

However, a design limitation exists in the improvement in the strength of the tape cassette structure. Therefore, it is preferable that the related art case can absorb the impact energy on its own without changing the tape structure, thereby protecting the tape cassette.

In this way, for protecting the tape cassette from the impact of dropping or the like, a tape cassette storage case provided with a bumper portion at the periphery is known in the related art (see, for example JP-A 2002-179176).

Figure 10:
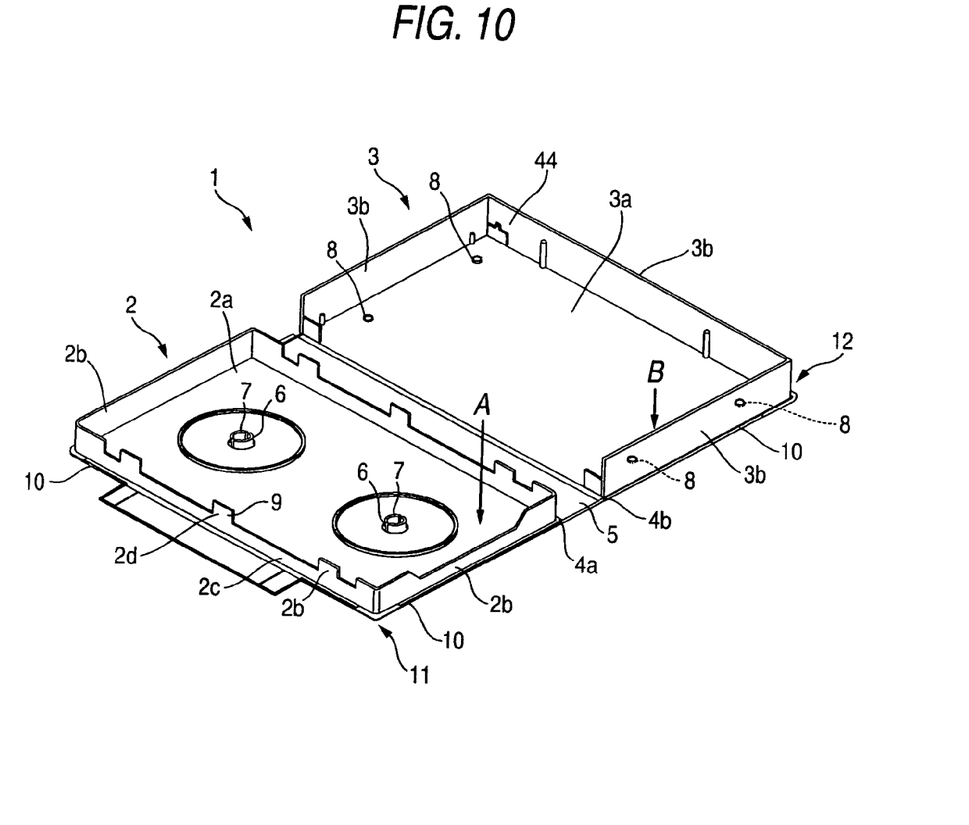
FIG. 10 is a perspective view showing a related art tape cassette storage case.

As described in FIG. 10, this tape cassette storage case 1 is provided with a case body 2 for storing a tape cassette, and a lid portion 3 for covering an opening above the case body 2. The case body 2 is provided with a bottom plate 2a, and side walls 2b are set up along the periphery of the bottom plate 2a.

Meanwhile, the lid portion 3 is provided with an upper plate 3a that is connected to the bottom plate 2a of the case body 2 by a hinge 4a, a connecting plate 5, and a hinge 4b at one side of the upper plate 3a. The case body 2 and the lid portion 3 can open or close relative to each other, and side walls 3b are provided along the other three sides.

In convex portions 6 on the bottom plate 2a of the case body 2, projection portions 7 are set up to support a tape cassette such that the projections can be inserted into reel hub holes of the tape cassette. In addition, in the inner four corners of the upper plate 3a of the lid portion 3, bosses 8 are provided to hold the tape cassette therebetween. Furthermore, thin-walled portions 10 are formed to project on the outsides of the side walls 2b of the bottom plate 2a of the case body 2 and the side walls 3b of the upper plate 3a, as being operable to bumpers.

When user unintentionally drops the tape cassette storage case 1 and the impact strength is applied against the bottom plate 2a and the upper plate 3a in the direction perpendicular to the plates 2a, 3a, the convex portions 6 formed on the bottom plate 2a become elastically deformed toward the direction of the tape cassette thickness, thereby relieving the impact to be applied to the tape cassette. By this means, the reel and the tape cassette are prevented from being damaged.

Also, when the tape cassette storage case is dropped on its corner or on its side surface, the thin-walled portions 10 function as bumper portions and deform. Thus, the encased tape cassette is relieved from the impact.

However, more specifically, when the tape cassette storage case 1 is subjected to being dropped from its corner, the impact energy concentrates on the corner. Thus, there is a need to thicken the thin-walled portions 10, because if the thin-walled portions 10 are formed too thin, the thin-walled portions 10 are damaged or plastically deformed on its own.

On the contrary, if the thin-walled portions 10 are formed too thick, the rigidity of the case is too high and there is a difficulty in absorbing the impact energy. Therefore, the bumper function becomes low. As a result, the tape cassette storage case can neither absorb the impact energy nor protect the tape cassette encased therein. Although the suitable thickness of the thin-walled portions 10 differs depending on the direction of the drop, when the tape cassette storage case 1 is specifically subjected to the corner drop (i.e., dropped on its corner), since the impact energy concentrates on the corner, deformation of the thin-walled portion 10 on the corner are large in comparison with the deformation that occurs when the tape cassette storage case 1 is subjected to the plane drop (i.e., dropped on the side walls 2b, 3b). Accordingly, there has been no uniform thickness of the thin-walled portions 10 having bumper capability suitable for the both drops.

SUMMARY OF THE INVENTION

An object of the invention is to provide a tape cassette storage case that can relieve impact and steadily protect a tape cassette encased therein in both corner drop and plane drop conditions.

The object of the invention is achieved by a tape cassette storage case, comprising: a case body provided with a bottom plate having a rectangular shape and a side wall set up along a periphery of the bottom plate so that the tape cassette can be stored; a lid portion having a connecting portion connected to one side of the case body with a hinge so that the lid portion covers an opening side enclosed by the side wall; and a bumper portion provided at a periphery of the case body and the lid portion including an opposite side of the connecting portion so that the bumper portion projects to an outside from the side wall when the lid portion is in a closed position, wherein the bumper portion has thick-walled portions at each corner of the bumper portion, the thick-walled portions being formed thicker than other portions of the bumper portion.

In the tape cassette storage case according to the present invention, the bumper portion, which projects from the periphery of the side walls 2b, 3b to outside and extends, absorbs impact energy and protects a tape cassette encased in the case. On the other hand, when the tape cassette storage case drops on the corner of the case, the impact energy becomes large. However, the thick-walled portions formed in the corner of the bumper, which are formed thicker than other portions of the bumper portion, receive the impact. Therefore, it is possible that the bumper portion absorbs the impact along with being prevented from damage, large crush or the like, and thereby steadily protecting a tape cassette encased therein.

The tape cassette storage case according to the invention can relieve impact acceleration against every drop direction, such as corner drop and plane drop, and steadily protect a tape cassette encased therein.

BRIEF DESCRIPTION OF THE DRAWINGS

FIGS. 6A and 6B are enlarged perspective views of corner portions.

DETAILED DESCRIPTION OF THE INVENTION

Modes of the tape cassette storage case according to the invention will be described in detail below with reference to accompanying drawings.

Figure 1:
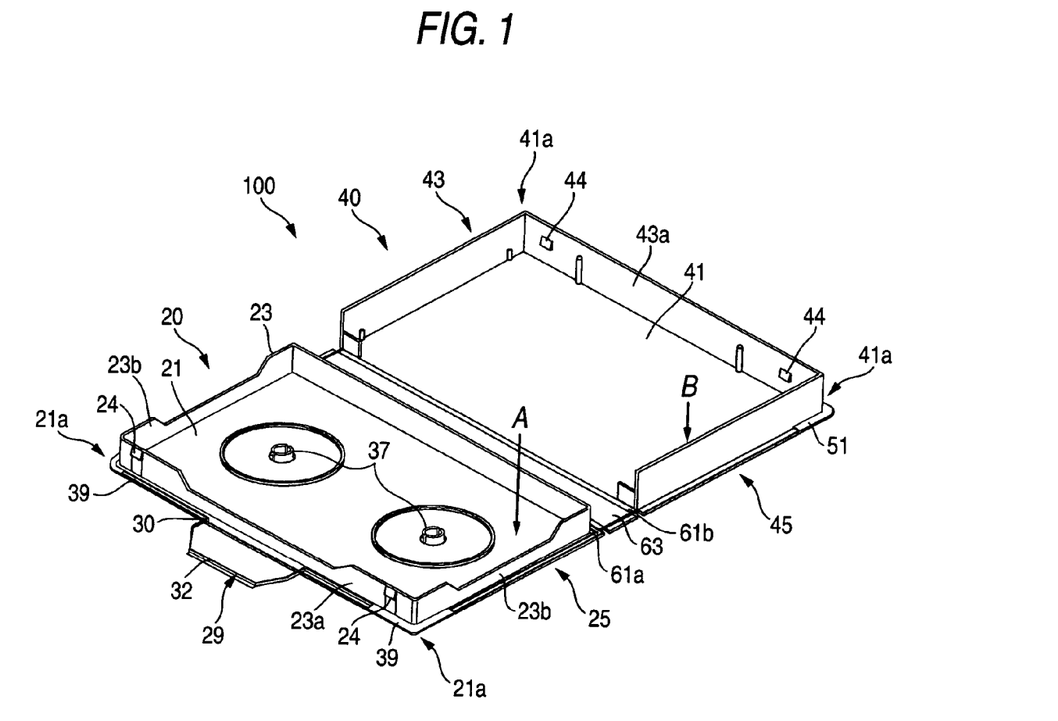
FIG. 1 is a perspective view showing an embodiment of a tape cassette storage case according to the invention when a lid portion is open.
Figure 2:
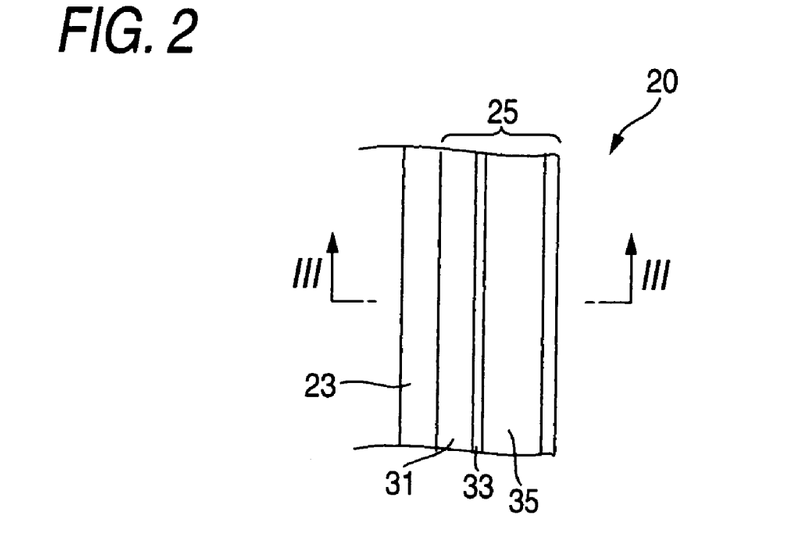
FIG. 2 is a view of a case body in FIG. 1 on arrow A.
Figure 3:
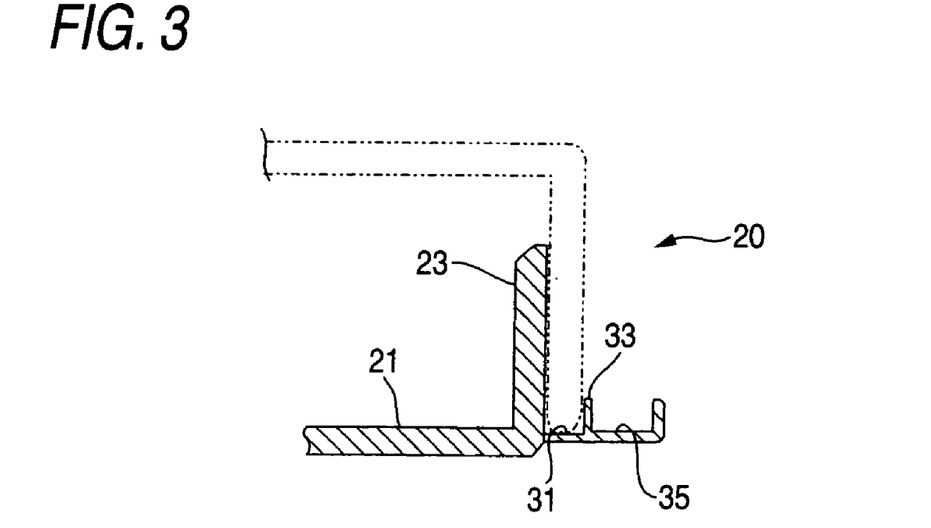
FIG. 3 is a cross-section view taken along line III-III of FIG. 2.
Figure 4:
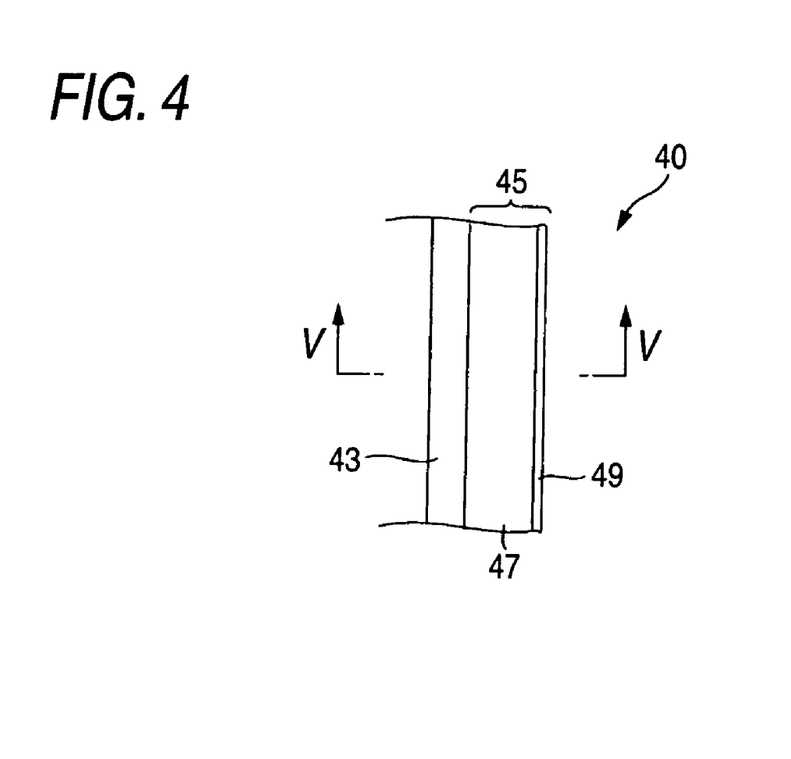
FIG. 4 is a view of a case body in FIG. 1 on arrow B.
Figure 5:
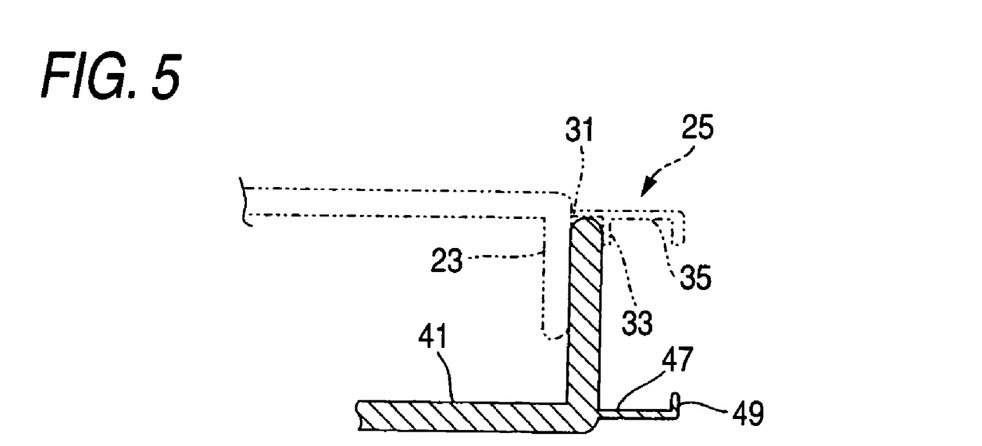
FIG. 5 is a cross-section view taken along line V-V of FIG. 4.

FIG. 1 is a perspective view showing one embodiment of a tape cassette storage case according to the invention when a lid portion is open. Also, FIG. 2 is a view of a case body in FIG. 1 on arrow A, FIG. 3 is a cross-section view taken along line III-III of FIG. 2, FIG. 4 is a view of a case body in FIG. 1 on arrow B, and FIG. 5 is a cross-section view taken along line V-V of FIG. 4.

As shown in FIG. 1, in a tape cassette storage case 100 according to the invention, a case body 20 is provided with side wall 23 set up along the periphery of a bottom plate 21 having a rectangular shape so that a tape cassette (omitted in Figs) is capable of being stored inside the side wall 23, and a lid portion 40 connected to one side of the case body 20 with a hinge 61a, a connecting plate 63 as a joint portion, and a hinge 61b openable and closable. Accordingly, the lid portion 40 covers an opening side of the side wall 23 of the case body 20.

The side wall 23 set up from the bottom plate 21 of the case body 20 is composed of corner portion 21a of the bottom plate 21, a side wall 23a of a front side extended therebetween, and side walls 23b of opposite sides. The heights of the side walls 23a, 23b are made low at each center portion so that a tape cassette stored in the case can be easily taken out. In the bottom plate 21 of the case body 20, a pair of projections 37, 37 set up to support a tape cassette such that the projections can be inserted into reel hub holes of a tape cassette.

In addition, at the outer face around opposite sides of the side wall 23a, engaging portions 24 are formed to project so that when the lid portion 40 is closed, the engaging portions 24 are engaged to engaging portions 44 that are formed to project at the inner face of the front side of the side wall 43a of the lid portion 40. As a result, when closing the lid portion 40, the case body 20 is locked to the lid portion 40 tentatively.

A periphery edging portion 25 extends along the outside of the side wall 23 of three sides except on a hinge 61 side in the case body 20. At the center portion of the front side of the periphery edging portion 25, a side locking portion 29 is formed rotatably centering around a hinge 30 that can be engaged with the side wall 43a of the front side of the lid portion 40 and locked when the lid portion 40 is closed.

Also, at the inner face of the side rocking portion 29, for example, a engaging portion 32 is formed to be engagable to the side wall 43a of the front side of the lid portion 40. In addition, engaging means such as button, plate fastener (magic tape) may be appropriately used to perform the above-mentioned engaging function, instead of the engaging portion 32.

As shown in FIG. 2, at a periphery portion 25 of the case body 20, a projected rim 33 is formed to have a gap 31 corresponding to the thickness of the side wall 43a in parallel to the side wall 23. When the lid portion is closed, as described below, a tip of the side wall 43 of the lid portion 40 is inserted into the gap 31, and the lid portion 40 and the periphery edging 25 are intimately jointed to each other. Also, as shown in FIG. 3, a thin-walled portion 35 having a prescribed width thinner than the thickness of the bottom plate 21 is provided at the outside of the projected rim 33 to extend outside. Also, a tip of the thin-walled portion 35 is bent toward the periphery edging 45 side of the lid portion 40 that is opposed when closed (the upper side in FIG. 3). Accordingly, the periphery edging portion 25 is formed as the bumper portion at the outside of the side wall 23 of three sides of the case body 20 except on the hinge 61a side.

On the other hand, in the lid portion 40, a side wall 43 is provided along three sides except on a hinge 61b side as shown in FIG. 1. Also, a periphery edging portion 45 is provided at the outside of the side walls 43 as shown in FIG. 4. When the lid portion 40 is closed, the side wall 43 covers the outside of the side wall 23 of the case body 20, and a tip of the side wall 43 can be fitted into the gap 31 between the projected rim 33 provided at the periphery edging portion 25 and side wall 23 of the case body 20 as shown in FIG. 5. This configuration prevents entrance of foreign matter, dust or the like into the tape cassette storage case 100.

Moreover, in a side wall 43a of the front side of the lid portion 40, engaging receiving means (omitted in Figs) for performing the function of locking the lid portion 40 to be engaged by the engaging portion 32 of the side locking portion 29 provided at the case body 20 is provided at the center portion of the outer face thereof.

As shown in FIGS. 4 and 5, a thin-walled portion 47 having a prescribed width thinner than the thickness of an upper plate 41 is provided at a periphery edging portion 45 of the lid portion 40. Further, a tip of the thin-walled portion 47 is bent toward the periphery edging 25 side of the case body 20 that is opposed when closed (the upper side in FIG. 5). Accordingly, the periphery edging portion 45 is formed as a bumper portion at the outside of the side wall 43 of three sides of the lid portion 40 except on the hinge 61b side.

In addition, the height of the side wall 43 is constructed such that the tip of the side wall 43 substantially touches the periphery edging portion 25 when the lid portion 40 is closed.

Figure 6A:
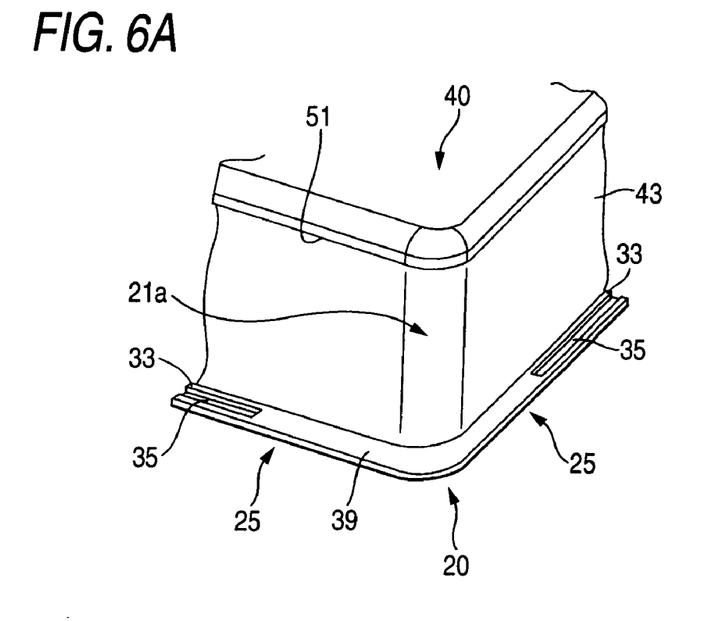
FIG. 6A is a view in which a case body is located on the underside.
Figure 6B:
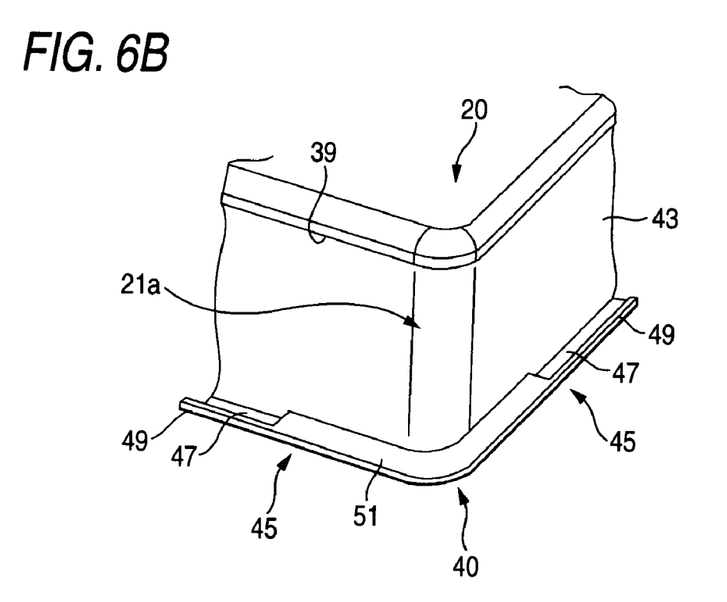
FIG. 6B is a view in which a lid portion is located on the underside.

An enlarged perspective view of a corner portion of the case body is illustrated in FIGS. 6A and 6B. FIG. 6A is a view in which the case body 20 is located on the underside, and FIG. 6B is a view in which the lid portion 40 is located on the underside.

As shown in FIGS. 6A and 6B (and also see FIGS. 1 to 5), in a periphery edging portion 25 around a corner portion 21a of the bottom plate 21 of the case body 20 and a periphery edging portion 45 around a corner portion 41a of the upper plate 41 of the lid portion 40, thick-walled portions 39, 51 in which the thickness of the thin-walled portions 35, 47 are made thicker than that of other thin-walled portions 35, 47 are provided.

Also, the thin-walled portions 35, 47 except for the corner portions have the structure described above. Also, relating to the thickness, from a viewpoint of not only impact absorbing capability that improves with an increase of the thickness but also formability, it is reasonable that the thickness is, for example, about 0.8 mm.

The thicknesses suitable for the thin-walled portions 35, 47 and the thick-walled portions 39, 51 are described below with reference to the result in which acceleration that acts on a tape cassette was compared to when the tape cassette storage case 100 was dropped.

Figure 7A:
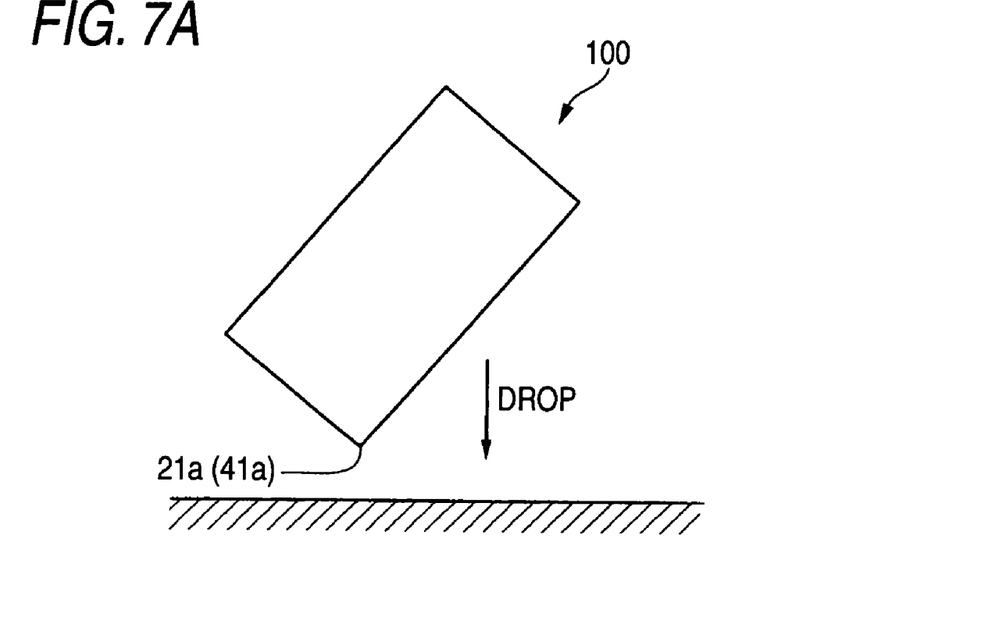
FIGS. 7A and 7B are explanation views showing drop directions of a tape cassette storage case.
Figure 7B:
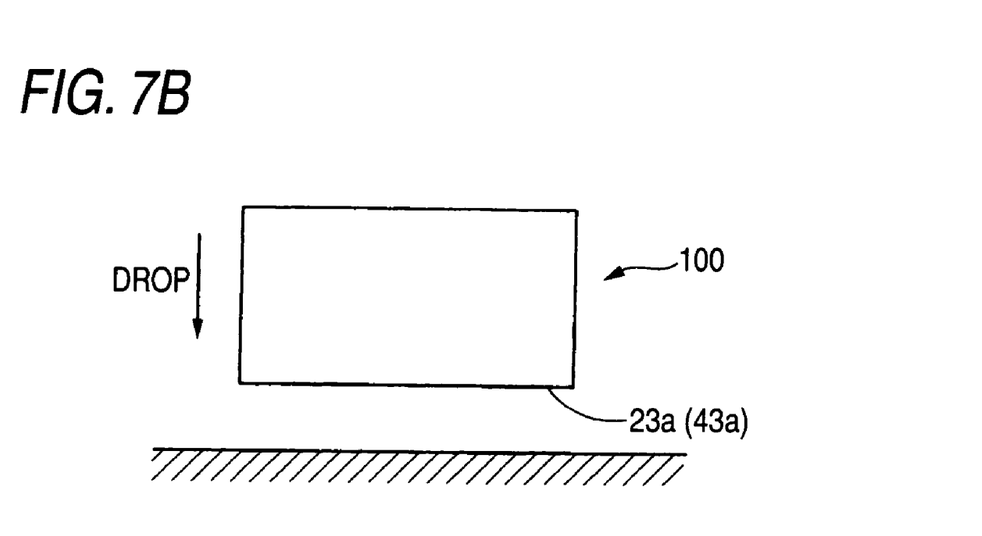

The directions of the drop of the tape cassette storage case 100 are shown in FIGS. 7A and 7B. As described below, a condition where the tape cassette storage case 100 is dropped down on the corner portions 21a, 41a as illustrated in FIG. 7A is called a corner drop. A condition where the case is dropped down from side walls 23a, 43a as illustrated in FIG. 7B is called a plane drop.

Figure 8:
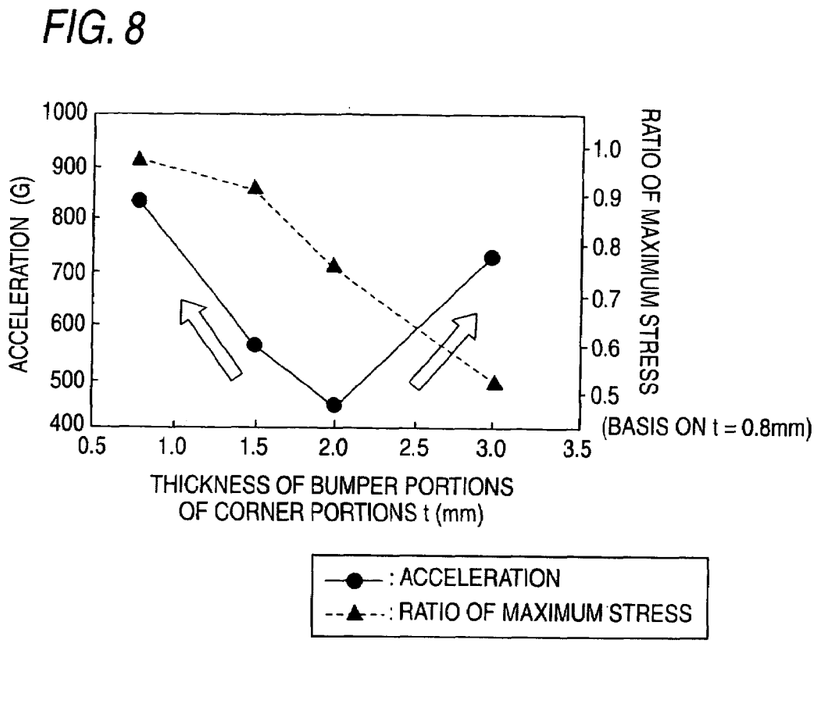
FIG. 8 is a graph showing a relation between a thickness of thick-walled portions and acceleration that acts on a tape cassette and a relation between a thickness of thick-walled portions and maximum stress.

FIG. 8 shows one example of the change of acceleration indicating impact force that acts on the tape cassette encased in the tape cassette storage case 100 when the thickness of the thick-walled portions 39, 51 (see, FIGS. 6A and 6B) is changed for the corner drop (the thick-walled portions 39, 51 both have the substantially same thickness). In FIG. 8, the vertical axis represents impact acceleration (G) and the horizontal axis represents a bumper thickness (t(mm)) of the corner portions 21a, 41a (i.e., thickness of the thick-walled portions 39, 51). The tape cassettes used for this Figure weighed 500 g.

As shown in FIG. 8, when the thickness of the thick-walled portions 39, 51 of the corner portions (see, FIGS. 6A and 6B) increases from 0.8 mm (which is the same as that of the thin-walled portions 35, 47), the acceleration decreases from about 820 (G). When the thickness is 2.0 mm, the acceleration reaches a minimum value of about 430 (G). As the thickness further increases, the acceleration increases again.

Accordingly, when the thickness of the thick-walled portions 39, 51 is smaller than 2.0 mm, since the thick-walled portions are easily crushed and causes plastic deformation with the decreasing thickness, the absorbing ratio of the impact energy decreases and the impact acceleration increases. On the contrary, when the thickness of the thick-walled portions 39, 51 are above 2.0 mm, the rigidity of the thick-walled portions 39, 51 increases with the increasing thickness. By the increasing rigidity, the absorbing ratio of the impact energy decreases. Then, the impact acceleration increases.

As this result, when the thickness of the thick-walled portions 39, 51 is about 2.0 mm, the acceleration that acts on the encased tape cassette is substantially minimized, and the impact is substantially minimized against the corner drop. That is, since the absorbing ratio of the impact energy due to the bumper portions 27, 49 is maximized when the thickness of the thick-walled portions 39, 51 is about 2.0 mm, in this tape cassette storage case, it is most appropriate that the thick-walled portions 39, 51 have thickness of about 2.0 mm.

Next, when a ratio of maximum stress based on the maximum stress of the bumper having the thickness of 0.8 mm is shown on the vertical axis, a relation between a thickness of the thick-walled portions 39, 51 and maximum stress is also shown by a broken line in FIG. 8.

When the stress, in which the thickness of the thick-walled portions 39, 51 is about 0.8 mm which is substantially the same as that of other thin-walled portions 35, 47, is taken to be a value of about 1, the ratio of the maximum stress decreases with the increasing thickness. As a result, it is found that when the thickness is about 2.0 mm, the maximum stress that acts on the encased tape cassette decreases by less than about 80 percent. When considering only the ratio of the maximum stress, it is preferable to increase the thickness of the thick-walled portions 39, 51. However, it is said to be appropriate that the thick-walled portions 39, 51 are set to have the thickness of 2.0 mm in consideration of the relation with the impact acceleration.

Figure 9:
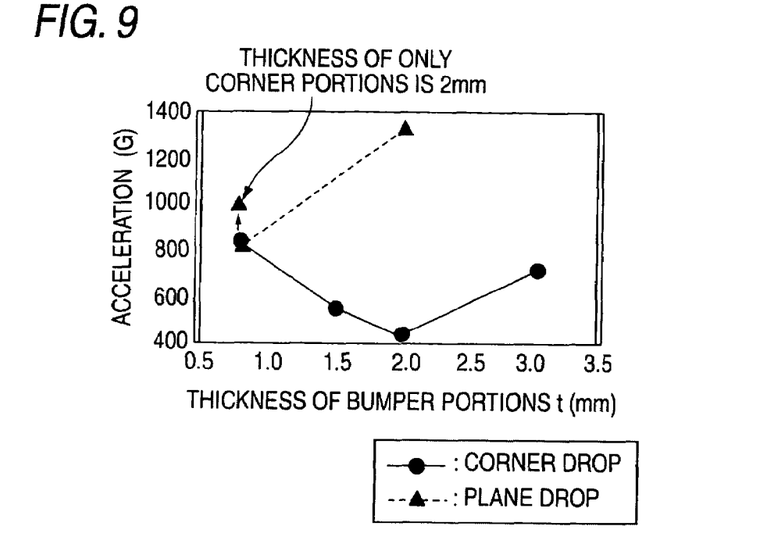
FIG. 9 is a graph showing a relation between impact acceleration that acts on an encased tape cassette and a thickness of bumper portions.

FIG. 9 shows one example of a relation between the impact acceleration that acts on the tape cassette encased in the case 100 and the thickness of the bumper portions on the corner drop and the plane drop. Also, the vertical axis represents the impact acceleration (G) and the horizontal axis represents the thickness (t(mm)) of the bumper portions.

In FIG. 9, the solid line shows the corner drop and the broken line shows the plane drop. The thickness of the bumper portions on the corner drop is the same as that in FIG. 8. Also, the thickness of the bumper portions is 2.0 mm on the plane drop means a tape cassette storage case in which the thickness of the outer edging portions 25, 45 is set at a constant value of about 2.0 mm, which is the same as that of the corner portions 39, 51.

On the corner drop illustrated in FIG. 9, by setting the thickness of the thick-walled portions 39, 51 at 2.0 mm as well as that illustrated in FIG. 8, it is possible to minimize the impact acceleration that acts on the encased tape cassette. On the contrary, on the plane drop, when the thickness of the periphery edging portions 25, 45 is uniformly set at 2.0 mm, since the rigidity increases and the impact acceleration increase as well, the thickness of the thin-walled portions 35, 47 on the periphery edging portions 25, 45 except the corner portions should be set at about 0.8 mm.

By the foregoing means, the rigidity on the corner drop does not increase excessively, and suitable impact absorbing capacity is obtained. Thereby, it is possible to reduce the impact acceleration that acts on the encased tape cassette. In the above case, it is found that the acceleration of the plane drop (1000 G) when only the thickness of the corner portions is set at 2.0 mm can be reduced by about 30 percent to the acceleration of the plane drop (1400 G) when the thickness is uniformly set at 2.0 mm.

Based on the above-described result, the impact that acts on the encased tape cassette can be minimized when the thickness of the thick-walled portions 39, 51 on the corners of the periphery edging portions 25, 45 is set at 2.0 mm and the thickness of the thin-walled portions 35, 47 of other periphery edging portions 25, 45 is set at 0.8 mm.

According to the above-described tape cassette storage case 100, since the thickness of the thick-walled portions 39, 51 as bumper portions is greater than that of other bumper portions, the storage case 100 can be prevented from being damaged and crushed caused by concentration of impact energy on its corner when the storage case 100 drops on the corner.

This configuration can steadily and effectively absorb impact that acts on an encased tape cassette, and protect a tape cassette even when the case drops from any direction due to the properties of the thin-walled portions 35, 47 on the plane drop and the properties of the thick-walled portions 39, 51 on the corner drop.

Also, the tape cassette storage case 100 of the invention is not limited to the above-described embodiment, and various changes and modifications may be made therein.

The above-described embodiment shows one explanatory example in which the thickness of the thin-walled portions 35, 47 on the bumper portion is set at 0.8 mm and the thickness of the thick-walled portions 39, 51 is set at 2.0 mm. That is, this embodiment shows one way of thinking for determining the thicknesses of the thin-walled portions 35, 47 and the thick-walled portions 39, 51. Accordingly, the value of the thickness is not limited to the above-describe value. These dimensions or the like are changeable depending on material or shape constructing the tape cassette storage case 100, and weight or material of an encased tape cassette.

What is claimed is:

1. A tape cassette storage case, comprising:
   a case body comprising a bottom plate having a rectangular shape and a side wall along a periphery of the bottom plate so that the tape cassette can be stored inside;
   a lid portion comprising a connecting portion connected to one side of the case body with a hinge so that the lid portion covers an opening side enclosed by the side wall; and
   a bumper portion provided at a periphery of the case body and the lid portion so that the bumper portion projects to an outside from the side wall when the lid portion is in a closed position, the periphery including opposite sides of the connecting portion in the case body and the lid portion,
   wherein the bumper portion has thick-walled portions, thicker than other portions of the bumper portion, at each corner of the bumper portion, and
   wherein the thickness of the thick-walled portions extends in a direction from the bottom plate to the lid portion when the lid portion covers the opening side.

2. The tape cassette storage case according to claim 1, wherein the bumper portion has thin-walled portions at the other portions of the bumper portion.

3. The tape cassette storage case according to claim 2, wherein the bumper portion comprises a first bumper portion provided at the case body, a second bumper portion provided at opposite sides of the connecting portion in a longitudinal direction, and a third bumper portion provided at the lid portion.

4. The tape cassette storage case according to claim 3, wherein the first bumper portion comprises a projected rim across a gap corresponding to a thickness of a side wall of the lid portion in parallel to the side wall of the case body.

5. The tape cassette storage vase according to claim 4, wherein a tip of the side wall of the lid portion is inserted into the gap when the lid portion is in the closed position.

6. The tape cassette storage case according to claim 3, wherein a tip of a thin-walled portion of the first bumper portion is bent toward the lid portion that is opposed when the lid portion is in the closed position.

7. The tape cassette storage case according to claim 3, wherein a tip of a thin-walled portion of the third bumper portion is bent toward the case body that is opposed when the lid portion is in the closed position.

* * * * *